(12) United States Patent
Kitamura

(10) Patent No.: US 7,842,197 B2
(45) Date of Patent: Nov. 30, 2010

(54) CONDUCTIVE MATERIAL, CONDUCTIVE FILM, AND PRODUCTION METHOD THEREOF

(75) Inventor: Takayuki Kitamura, Kohtoh-ku (JP)

(73) Assignee: Fujikura Ltd., Tokyo (JP)

( * ) Notice: Subject to any disclaimer, the term of this patent is extended or adjusted under 35 U.S.C. 154(b) by 9 days.

(21) Appl. No.: 11/910,571

(22) PCT Filed: Apr. 5, 2006

(86) PCT No.: PCT/JP2006/307242

§ 371 (c)(1),
(2), (4) Date: Oct. 3, 2007

(87) PCT Pub. No.: WO2006/117967

PCT Pub. Date: Nov. 9, 2006

(65) Prior Publication Data

US 2009/0152503 A1    Jun. 18, 2009

(30) Foreign Application Priority Data

Apr. 27, 2005    (JP) ............................. 2005-129511

(51) Int. Cl.
*H01B 1/20* (2006.01)
*B05D 5/12* (2006.01)

(52) U.S. Cl. ........................ 252/500; 427/58; 427/372.2

(58) Field of Classification Search ................. 252/500; 427/58, 372.2
See application file for complete search history.

(56) References Cited

U.S. PATENT DOCUMENTS 5,840,214 A * 11/1998 Kinlen ........................ 252/500

| | | | |
|---|---|---|---|
| 6,808,972 B2 | 10/2004 | Sirringhaus et al. | |
| 6,828,062 B2 * | 12/2004 | Lu et al. ..................... | 429/213 |
| 6,878,297 B1 | 4/2005 | Berger et al. | |
| 6,987,663 B2 * | 1/2006 | Merker et al. ............... | 361/523 |
| 7,438,832 B2 * | 10/2008 | Majumdar et al. .......... | 252/500 |
| 2006/0203322 A1 * | 9/2006 | Radmard et al. ............ | 359/265 |
| 2008/0139710 A1 * | 6/2008 | Tsukada et al. ............. | 524/100 |

FOREIGN PATENT DOCUMENTS

| EP | 0180082 A1 | 5/1986 |
|---|---|---|
| JP | 1-296572 A | 11/1989 |
| JP | 2003-22938 A | 1/2003 |
| JP | 2003-243028 A | 8/2003 |
| JP | 2005-51949 A | 2/2005 |
| WO | 00/02949 A1 | 1/2000 |
| WO | 03/106571 A1 | 12/2003 |

OTHER PUBLICATIONS

Lu et al "Use of Ionic Liquids for pi-Conjugated Polymer Electrochemical Devices", Science, vol. 297 (( Aug. 2002) pp. 983-987.*

(Continued)

*Primary Examiner*—Mark Kopec
(74) *Attorney, Agent, or Firm*—Sughrue Mion, PLLC

(57) ABSTRACT

There are provided a conductive material obtained by bringing a π conjugated polymer into contact with an ionic liquid and a conductive film obtained by bringing a π conjugated polymer film into contact with the ionic liquid. Method of producing them is provided.

10 Claims, 1 Drawing Sheet

OTHER PUBLICATIONS

Interchim Green Chemistry Ionic Liquids (no Pub data/no pub date) ppF54 and F63.*

Y. Saito, et al., "I$^-$/I3$^-$ redox reaction behavior on poly (3,4-ethylenedioxythiophene) counter electrode in dye-sensitized solar cells" J. Photochem. Photobiol.A:Chem., vol. 164, p. 153.

Y. Shibata, et al., "Quasi-solid dye sensitised solar cells filled with ionic liquid-increase in efficiencies by specific interaction between conductive polymers and gelators" Chem. Commun., 2003, p. 2730-2731.

* cited by examiner

CONDUCTIVE MATERIAL, CONDUCTIVE FILM, AND PRODUCTION METHOD THEREOF

This application is based upon and claims the benefit of priority from the prior Japanese Patent Application No. 2005-129511 filed Apr. 27, 2005, the entire contents of which are incorporated herein by reference.

TECHNICAL FIELD

The apparatuses and methods consistent with the present invention relate to a conductive material, a conductive film, and a production method thereof, and in particular, to an enhancement in conductivity of a π-conjugated polymer.

BACKGROUND

In many fields, investigations are being made into inorganic materials having lighter weight and a wider range of material selection than those of known inorganic materials. Since most π-conjugated polymers are polymers having conductivity and potentially have properties utilizable in various kinds of electronic materials, optical functional materials, and magnetic functional materials, studies for application of the π-conjugated polymers to various fields are energetically being conducted (for example, see Y. Saito et al., Journal of Photochemistry And Photobiology A: Chemistry (J. Photochem. Photobiol. A: Chem.), 2004, Vol. 164, p. 153; and Y. Shibata et al., Chemical Communications (Chem. Commun.), 2003, p. 2730 and 2731).

Polymer conductivity (σ) is expressed by Expression (1) as the product of a density (n) of mobile carriers (electrons) in the polymer, a mobility (µ) representing the ease of carrier movement, and the electronic charge (e) as follows.

$$\sigma = en\mu \qquad \text{Expression (1)}$$

Accordingly, any one of a method of enhancing the carrier density 'n' in a material and a method of improving the mobility µ is used in order to enhance the conductivity (σ). In general, the π conjugated polymer has semiconductor-like conductivity and the conductivity is determined by energy levels of the top of the valence band (HOMO: highest occupied molecular orbital) and the bottom of the conduction band (LUMO: lowest unoccupied molecular orbital) determined by a molecular structure of the polymer, a width (a width of a forbidden band) between the HOMO and the LUMO, and the energy level of impurities doped in the forbidden band. Here, although the carrier density can be controlled by the doping in a relatively easy manner, the carrier density is generally reversible in the atmosphere. Meanwhile, the mobility changes greatly by the molecular structure, conformation, packing between polymer chains, crystalline properties, and the like, and thus it is difficult to control or enhance the mobility.

SUMMARY

In the related art, as a method of controlling or enhancing the conductivity, there has been conducted a method of changing the polymerization conditions including a monomer in an electrolyte solution, electrolyte concentration, the type or density of a dopant, the polymerization potential, current density, temperature, and the presence or absence of agitation, during synthesis of π-conjugated polymers performed by electrolyte polymerization. Alternatively, there has also been conducted a method of immersing the π-conjugated polymers in a dopant solution after polymerization, for example. However, in fact, in the method, π-conjugated polymers having certain properties are only synthesized as a result of the polymerization conditions and the method is far from being able to control the conductivity.

Embodiments of the present embodiment are contrived in view of these circumstances. It is an exemplary object to provide a conductive material having high conductivity acquired from the π-conjugated polymer. An embodiment of the invention may also provides a method of controlling and enhancing the conductivity of the π-conjugated polymer in a simple manner.

The inventor has found that it is possible to easily control the conductivity of a π-conjugated polymer by bring the π-conjugated polymer into contact with an ionic liquid, which is not disclosed in the related art.

According to one exemplary embodiment, there is provided a conductive material obtained by bringing the π-conjugated polymer into contact with the ionic liquid.

In the conductive material, the conductivity of the conductive material may be 10 times or more the conductivity of the π-conjugated polymer before being brought into contact with the ionic liquid.

According to a second exemplary embodiment, there is provided a conductive film obtained by bringing the π-conjugated polymer film into contact with the ionic liquid.

In the conductive film, the sheet resistance of the conductive material may be 0.1 times or less the sheet resistance of the π-conjugated polymer film before being brought into contact with the ionic liquid.

According to a third exemplary embodiment, there is provided a method of producing the conductive material including the steps of preparing the π-conjugated polymer and bringing the π-conjugated polymer into contact with the ionic liquid.

According to a fourth exemplary embodiment, there is provided a method of producing the conductive film including the steps of preparing the π-conjugated polymer film and bringing the π-conjugated polymer film into contact with the ionic liquid.

According to exemplary embodiments, it is possible to enhance the conductivity of a π-conjugated polymer in a very simple manner. It is possible to arbitrarily control the conductivity by means of a very simple parameter such as a processing time or a processing temperature. Exemplary embodiments can contribute to a performance improvement of almost all electronic devices including a photoelectric conversion element, an electroluminescence element, a sensor, a condenser, and the like which employ the π-conjugated polymer having conductivity.

DETAILED DESCRIPTION OF EXEMPLARY EMBODIMENTS OF THE INVENTION

Figure 1:
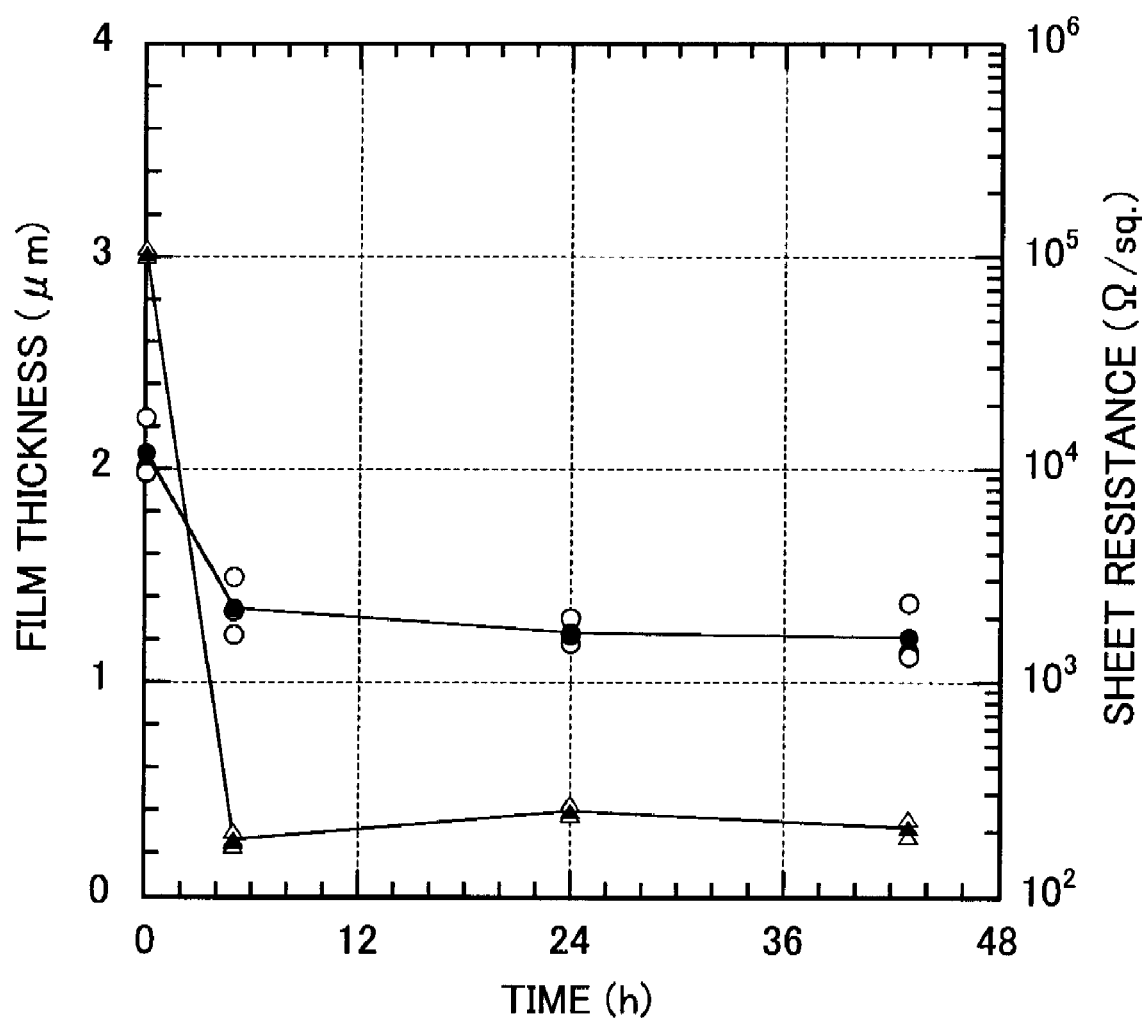
FIG. 1 is a graph showing a temporal change of a film thickness and a sheet resistance according to Example 1 of an exemplary embodiment to the embodiment.

A conductive material can be obtained by bringing a π-conjugated polymer into contact with an ionic liquid. Moreover, a conductive film refers to a film-like conductive material, and thus the terminology referrers to as a conductive material includes the conductive film.

The π-conjugated polymer represents a polymer having a π-conjugate system formed by conjugating two or more of π bonds (that is, multiple bonds). A specific example of the π-conjugated polymer includes a salt (PEDOT/PSS) of poly (3,4-ethylenedioxy thiophene) (PEDOT) and poly (styrenesulfonic acid) (PSS). The π-conjugated polymer may include one kind of π-conjugated polymer or a π-conjugated polymer compound in which a plurality of kinds of π-conjugated polymers are compounded.

The ionic liquid which is a salt composed of anion and cation refers to a substance exhibiting a property and a state as a liquid at room temperature. Specific examples of the ionic liquid include liquid imidazolium salts such as iodidated 1-hexyl-3-methylimidazolium (HMImI), bis(trifluoromethane sulfonic acid)imide 1-ethyl-3-methylimidazolium (EMImTFSI).

As a method of bringing the π-conjugated polymer into contact with the ionic liquid, a method of immersing the π-conjugated polymer in the ionic liquid and a method of applying to or spraying the ionic liquid on the π-conjugated polymer may be used. Bringing the π-conjugated polymer into contact with the ionic liquid can be performed in the atmosphere in a simple manner. A condition at the time of bringing the π-conjugated polymer into contact with the ionic liquid, for example, a processing time or a processing temperature, depends on the available π-conjugated polymer and ionic liquid, but the processing temperature may be room temperature and a heating temperature, for example. It is possible to arbitrarily control the conductivity by changing the processing time or the processing temperature.

The form of the π-conjugated polymer at the time of bringing the π-conjugated polymer into contact with the ionic liquid is not particularly limited to a film, a fiber, a granule, a powder, and a mass, but it is desirable that the ionic liquid act on the π-conjugated polymer evenly. For example, when the π-conjugated polymer has the form of the film (that is, the π-conjugated polymer film), a film formed on a substrate such as glass is supported through the substrate, and thus, handling thereof becomes easy and the ionic liquid is brought evenly into contact with the entire surface of the film.

Other substances, for example, an additive such as iodine may be added to the ionic liquid within the scope of not negating the advantages of the embodiment.

After bringing the π-conjugated polymer into contact with the ionic liquid, a suitable additional process may be performed as necessary. For example, the ionic liquid excessively attached to the π-conjugated polymer may be removed by washing a material after the contact processing with an organic solvent such as ethanol or acetonitrile. It is possible to remove an excessive organic solvent by drying under room temperature conditions or heating temperature conditions after washing with the organic solvent.

The conductivity of the π-conjugated polymer after being brought into contact with the ionic liquid can be enhanced to 10 times or more the conductivity of the π-conjugated polymer before being brought into contact with the ionic liquid. Accordingly, the material obtained by bringing the π-conjugated polymer into contact with the ionic liquid potentially has excellent conductivity utilizable in various kinds of electronic materials, optical functional materials, and magnetic functional materials, and thus the material is useful as a conductive material.

The sheet resistance of the π-conjugated polymer film after being brought into contact with the ionic liquid can decrease to 0.1 times or less the sheet resistance of the π-conjugated polymer film before being brought into contact with the ionic liquid. Accordingly, the film obtained by bringing the π-conjugated polymer film into contact with the ionic liquid potentially has excellent conductivity utilizable in various kinds of electronic materials, optical functional materials, and magnetic functional materials, and thus the film is useful as a conductive film.

The detailed mechanism that provides the advantage of enhancing the conductivity by bringing the π-conjugated polymer into contact with the ionic liquid is not clear at the time of application of the embodiment, but the π-conjugated polymer is believed to undergo a chemical change or a physical change by bringing the π-conjugated polymer into contact with the ionic liquid from the finding that the conductivity is remarkably enhanced as described in Examples to be described later. The π-conjugated polymer and the ionic liquid may be compounded.

In the conductive material, since the ionic liquid itself does not serve as the carrier, the number of carriers of the conductive material is believed to be the same as that of the π-conjugated polymer. Although the π-conjugated polymer may change in volume (change in film thickness) at the time of being brought into contact with the ionic liquid, there is an advantage of remarkably enhancing the mobility of the carrier of the π-conjugated polymer from the finding that the conductivity is enhanced in comparison with a change in carrier density resulting from the change in volume (when it is assumed that the conductivity does not change).

EXAMPLES

Hereinafter, exemplary embodiments are described with reference to examples, but the embodiment is not particularly limited to the examples.

Method of Measuring Film Thickness:

A film thickness (t) was measured by a contact needle-type surface profile measuring system (Dektak 3030, manufactured by Sloan Company).

Method of Measuring Sheet Resistance:

A sheet resistance ($\rho_s$) was measured by a resistivity meter (Loresta GP, Model MCP-T610, manufactured by Dia Instruments Co., Ltd.) equipped with a PSP-type probe (MCP-TP06P) having 4 terminals and 4 pins on the basis of JIS K 6911.

Method of Measuring Conductivity:

A volume resistivity ($\rho_v$) was expressed by the product of the sheet resistance ($\rho_s$) and the film thickness (t) (that is, $\rho_v = \rho_s t$). From measurement values of the film thickness and the sheet resistance measured by the measuring methods, the conductivity (σ) was calculated by Expression (2) as follows.

$$\sigma = 1/\Sigma_v = 1/\rho_s t \qquad \text{Expression (2)}$$

Example 1

By means of a salt (PEDOT/PSS) of commercial poly (3,4-ethylenedioxy thiophene) (PEDOT) and commercial poly (styrenesulfonic acid) (PSS), a 10 (10 mm slide glass was coated with filtrate obtained by filtrating water dispersion liquid (produced by Aldrich) of the PEDOT/PSS with a cellulose acetate filter (0.8 (m) by a cast method. A PEDOT/PSS film, as a conductive film, was obtained by drying the obtained coated film at room temperature for 15 minutes or longer and heat-treating it at 85(C for 15 minutes or longer.

The PEDOT/PSS film was immersed in the ionic liquid (iodidated 1-hexyl-3-methylimidazolium: HMImI) and was maintained at 85(C while the PEDOT/PSS film was laid on the slide glass. After cooling the PEDOT/PSS film to room temperature, the PEDOT/PSS film after being brought into contact with the ionic liquid was washed with ethanol and dried.

In the operation, the ionic liquid HMImI was placed at a potential level which did not cause oxidation or reduction of the PEDOT/PSSS, and thus the carrier density (n) of the polymer film did not change.

The film thickness and the sheet resistance of the conductive film were measured by the measuring methods both before and after being brought into contact with the ionic liquid. The conductivity of the conductive film was calculated from the measurement values. FIG. 1 shows a temporal change of the film thickness and the sheet resistance in Example 1. The number of samples was set to 3. In FIG. 1, a white circle represents a film thickness of each sample, a black circle represents an average value of the film thickness, a white triangle represents a sheet resistance of each sample, and a black triangle represents an average value of the sheet resistance.

An average value of the conductivity calculated by Expression (2) is shown in Table 1.

Moreover, a "time" shown in FIG. 1 and Table 1 represents a time (that is, the processing time) during which the conductive film was immersed in the ionic liquid (HMImI) and was maintained at 85° C.

TABLE 1

| Time/h | Conductivity/(S/cm) |
|---|---|
| 0 | 4.7 |
| 5 | 4,120 |
| 24 | 3,260 |
| 43 | 3,990 |

As shown in FIG. 1, immediately after the production, the PEDOT/PSS film had a film thickness of 2.0±0.3 μm and a sheet resistance of $4×10^4$ to $2×10^5$ Ω/square, whereas 5 hours after immersing in the ionic liquid, the PEDOT/PSS film had a film thickness of 1.3±0.2 μm and a sheet resistance of about $2.0±0.4×10^2$ Ω/square. Therefore, the sheet resistance decreased by 2 digits or more. The film thickness and the sheet resistance almost did not change even after a process time of longer than 5 hours. The conductivity increased by about 3 digits as shown in Table 1, and thus the conductivity was remarkably enhanced with the change in the film thickness and the sheet resistance.

Example 2

The immersion processing was performed in the same manner as Example 1 except for setting a processing temperature of processing the PEDOT/PSS film by using the ionic liquid (HMImI) to room temperature and setting an immersion processing time to 6 days, and thus the film thickness and the sheet resistance of the conductive film were measured before and after being brought into contact with the ionic liquid. A film forming method of the PEDOT/PSSS film was the same as that in Example 1. The measurement result (the average value of three samples) of the film thickness, sheet resistance, and conductivity is shown in Table 2.

TABLE 2

| Time/day | Film thickness/μm | Sheet resistance/(Ω/sq.) | Conductivity/(S/cm) |
|---|---|---|---|
| 0 | 3.8 | $2.43 × 10^5$ | 10.9 |
| 6 | 2.4 | 83.3 | 5,260 |

Even in case of the immersion processing at room temperature, the conductivity was remarkably enhanced. That is, in Example 2, the conductivity after immersing the conductive film in the ionic liquid for 6 days was enhanced up to 500 times as shown in Table 2.

Example 3

The immersion processing was performed in the same manner as Example 1 except for setting the processing temperature of processing the PEDOT/PSS film by using the ionic liquid such as the HMImI, bis(trifluoromethane sulfonic acid)imide 1-ethyl-3-methylimidazolium (EMImTFSI), or a 10:1 mixture of the HMImI and the iodine ($I_2$) to the room temperature and setting the immersion processing time to 40 hours, and thus the film thickness and the sheet resistance of the conductive film were measured before and after being brought into contact with the ionic liquid. A film forming method of the PEDOT/PSSS film is the same as that in Example 1. The measurement result (the representative value of one sample) of the film thickness, sheet resistance, and conductivity is shown in Table 3.

TABLE 3

| Ionic liquid | Sheet resistance (Ω/sq.) |
|---|---|
| None | $1.6 × 10^5$ |
| HMImI | $2.9 × 10^2$ |
| HMImI + $I_2$ | $1.1 × 10^2$ |
| EMImTFSI | $1.4 × 10^4$ |

When the EMImTFSI was used as the ionic liquid and in addition, the mixture of the HMImI and the iodine was used as the ionic liquid, the sheet resistance decreased greatly. In other words, after the conductive film was immersed in the ionic liquid for 40 hours, the conductivity was enhanced.

Example 4

Production of the PEDOT/PSS film was performed by a spin coat method (2,500 revolutions per minute, 30 seconds). After a glass was spin-coated with the filtrate obtained by filtrating the water dispersion liquid (produced by Aldrich) of the PEDOT/PSS with the cellulose acetate filter (0.8 μm), the glass spin-coated with the filtrate was dried for 15 minutes or more at room temperature and then, it was heat-treated for 15 minutes or more at 85° C., thereby obtaining the PEDOT/PSS film. The operation was repeated 3 times so as to produce a PEDOT/PSS film having a film thickness of 0.24±0.04 μm. Moreover, the film thickness obtained by the spin coat method is approximately 1/10 the film thickness obtained by the cast method described in Example 1.

The immersion processing was performed in the same manner as Example 1 except for setting the processing temperature of processing the conductive film to the room temperature and setting the immersion processing time to 7 days, and thus the sheet resistance of the conductive film was measured before and after being brought into contact with the ionic liquid. The measurement result (the average value of three samples) of the sheet resistance is shown in Table 4.

TABLE 4

| Ionic liquid | Sheet resistance (Ω/sq.) |
|---|---|
| None | $3.93 × 10^4$ |
| HMImI | $3.99 × 10^3$ |
| EMImTFSI | $7.36 × 10^3$ |

Even when the PEDOT/PSS film (having the film thickness of 0.24±0.04 μm) formed by the spin coat method was used as the conductive film, the sheet resistance decreased greatly. In other words, after the conductive film was immersed in the ionic liquid for 7 days (for 1 week) at room temperature, the sheet resistance decreased by one digit, and thus the conductivity was enhanced.

Comparative Example 1

The film forming of the PEDOT/PSS film was performed by the spin coat method in the same manner as Example 4. The immersion processing (for 1 week at room temperature) was performed in the same manner as Example 4 except that the immersion processing is performed by using water, acetonitrile (AN), ethylene carbonate (EC), or toluene (Toluene) instead of the ionic liquid described in Example 4, and thus the sheet resistance of the conductive was measured before and after being brought into contact with the ionic liquid. The measurement result (the average value of three samples) of the sheet resistance is shown in Table 5.

TABLE 5

| Liquid | Sheet resistance (Ω/sq.) |
|---|---|
| None | $3.93 \times 10^4$ |
| AN | $4.49 \times 10^4$ |
| EC | $5.47 \times 10^4$ |
| Toluene | $1.57 \times 10^5$ |

When the conductive film was immersed in an organic solvent (acetonitrile, ethylene carbonate) or a nonpolar solvent (toluene) having high polarity frequently used in electrochemistry, the sheet resistance did not almost change or the sheet resistance rather increased, whereas the sheet resistance of the conductive film decreased by using the ionic liquid. Moreover, when the conductive film was immersed in the water, the PEDOT/PSS film was easily desorbed from the glass, and thus it was difficult to measure the sheet resistance.

Comparative Example 2

The film forming of the PEDOT/PSS film was performed by the spin coat method in the same manner as Example 4. The immersion processing (for 5 hours at 85° C.) was performed in the same manner as Example 1 except that the immersion processing was performed by using a dilute solution (a concentration of 0.2 mol/dm$^3$) of the HMImI, EMImTFSI, or acetonitrile (AN) of lithium perchlorate (LiClO$_4$) instead of the ionic liquid described in Example 1, and thus the sheet resistance of the conductive film was measured before and after being brought into contact with the ionic liquid. The measurement result (the average value of three samples) of the sheet resistance is shown in Table 6.

TABLE 6

| Liquid | Sheet resistance (Ω/sq.) |
|---|---|
| None | $1.61 \times 10^5$ |
| HMImI dilute solution | $2.09 \times 10^5$ |
| EMImTFSI dilute solution | $2.72 \times 10^5$ |
| LiClO$_4$ dilute solution | 6.11 (104 |

When the conductive film was processed with the dilute solution of the ionic liquid (HMImI or EMImTFSI) or the dilute solution of the inorganic ion pair (LiClO4), the sheet resistance did not almost change, whereas when the conductive film was processed with a pure ionic liquid, the sheet resistance decreased as described in each of the examples.

INDUSTRIAL APPLICABILITY

Embodiments of the embodiment may be used for almost all electronic devices including a photoelectric conversion element, an electroluminescence, a sensor, a condenser, and the like.

The invention claimed is:

1. A method of producing a conductive material, the method comprising:
   contacting a π conjugated polymer with an ionic liquid; and
   washing the conductive material with an organic solvent,
   wherein the conductivity of the conductive material is 10 times or more of the conductivity of the π conjugated polymer before being brought into contact with the ionic liquid.

2. The method of claim 1, wherein:
   the π conjugated polymer is formed from a salt of poly (3,4-ethylenedioxy thiophene) and poly (styrenesulfonic acid); and
   the ionic liquid is selected from 1-hexyl-3-methylimidazolium iodide, 1-ethyl-3-methylimidazolium bis(trifluoromethane sulfonic acid) imide, and a 10:1 mixture of the 1-hexyl-3-methylimidazolium iodide and iodine.

3. The method of claim 1, further comprising:
   drying the conductive material.

4. The method of claim 1 wherein the conductivity of the conductive material is altered by altering a length of time that the π conjugated polymer is in contact with the ionic liquid.

5. The method of claim 1, wherein the conductivity of the conductive material is altered by altering a temperature at which the π conjugated polymer is put in contact with the ionic liquid.

6. A method of producing a conductive film, the method comprising:
   contacting a π conjugated polymer film with an ionic liquid; and
   washing the π conjugated polymer film with an organic solvent,
   wherein, the sheet resistance of the conductive film is 0.1 times or less of the sheet resistance of the π conjugated polymer film before being brought into contact with the ionic liquid.

7. The method of claim 6, wherein:
   the π conjugated polymer film is formed from a salt of poly (3,4-ethylenedioxy thiophene) and poly (styrenesulfonic acid); and
   the ionic liquid is selected from 1-hexyl-3-methylimidazolium iodide, 1-ethyl-3-methylimidazolium bis(trifluoromethane sulfonic acid) imide, and a 10:1 mixture of the 1-hexyl-3-methylimidazolium iodide and iodine.

8. The method of claim 6, further comprising:
   drying the conductive film.

9. The method of claim 6, wherein the conductivity of the conductive film is altered by altering a length of time that the π conjugated polymer film is in contact with the ionic liquid.

10. The method of claim 6, wherein the conductivity of the conductive film is altered by altering the temperature at which the π conjugated polymer film is put in contact with the ionic liquid.

* * * * *